United States Patent [19]

Vollmer et al.

[11] 4,109,556
[45] Aug. 29, 1978

[54] EXPANSION DOWEL

[75] Inventors: Helmut Vollmer, Balzers; Karl Ernst Udert, Triesen, both of Liechtenstein; Hans Oechsle, Nenzing, Austria

[73] Assignee: Hilti Aktiengesellschaft, Schaan, Liechtenstein

[21] Appl. No.: 789,225

[22] Filed: Apr. 20, 1977

[30] Foreign Application Priority Data

Apr. 20, 1976 [DE] Fed. Rep. of Germany ....... 2617212

[51] Int. Cl.$^2$ ........................................... F16B 13/06
[52] U.S. Cl. ..................................................... 85/84
[58] Field of Search ..................... 85/84, 82, 83, 72; 151/41.73, 41.74

[56] References Cited

U.S. PATENT DOCUMENTS 4,026,187  5/1977  Gross ...................................... 85/84

FOREIGN PATENT DOCUMENTS 2,152,729  4/1973  Fed. Rep. of Germany .............. 85/84
1,203,557  8/1970  United Kingdom ........................ 85/84

Primary Examiner—Ramon S. Britts
Attorney, Agent, or Firm—Toren, McGeady and Stanger

[57]  ABSTRACT

An expansion dowel consists of an axially elongated sleeve having a bore therethrough with an expansion body being displaceable through the bore for expanding at least an axially extending part of the sleeve. The expansion body has an annular shaped constriction in its rear portion so that the expansion body can be deformed in the region of the constriction after the expanding forces have reached a certain value.

10 Claims, 6 Drawing Figures

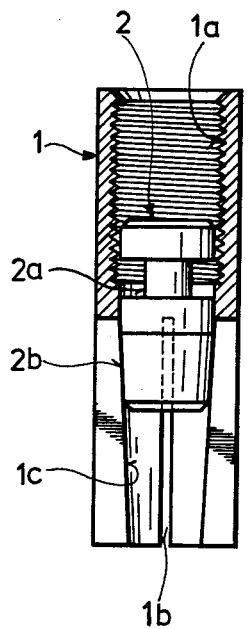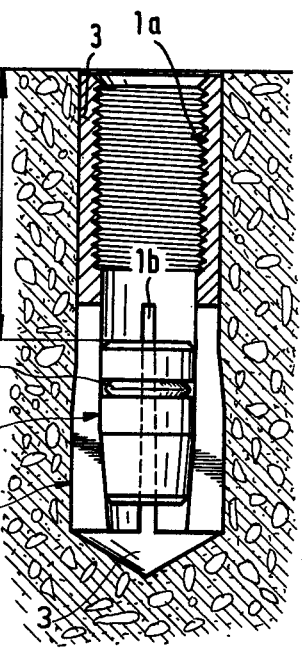
Fig.1  Fig.2  Fig.3
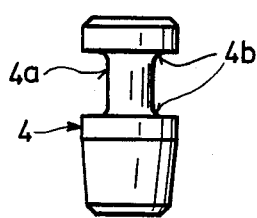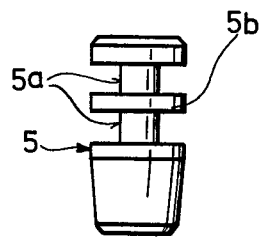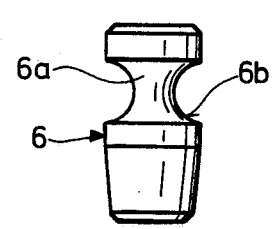
Fig.4  Fig.5  Fig.6

EXPANSION DOWEL

SUMMARY OF THE INVENTION

The present invention concerns an expansion dowel consisting of a sleeve slotted over a portion of its axial length with a bore extending through the sleeve and an expansion body axially displaceable through the bore for expanding the sleeve. The bore within the sleeve has a frusto-conical configuration in the region of the slots. The invention is more specifically directed to a deformable constriction formed in the expansion body.

Dowels of the general type mentioned above have been known for some time and are produced in a plurality of forms. Usually the sleeve and the expansion body are formed of a metal, preferably steel. Such expansion dowels are mainly utilized where a heavy load is involved. When setting the dowels, first the sleeve is introduced into a borehole of a corresponding diameter until its front or leading end contacts the base of the blind bore or the shoulder in a stepped bore. Next, usually by means of a special setting tool, the expansion body is driven axially through the sleeve for a predetermined dimension. For relatively large dowels the driving action is performed manually, while for smaller dowels it is preferable to use impact-generating tools. By driving in the expansion body, the sleeve is expanded radially outwardly and becomes anchored in the drill hole. The extraction value reached by a dowel after the expansion body has been displaced through the sleeve over a certain expansion length may, however, be very different at different strengths of the receiving material or at different diameter dimensions of the drill hole. For example, in a low strength receiving material or in a drill hole whose diameter has been made too large, the dowel sleeve may expand for too great an extent, while in a high strength receiving material or in a drill hole where the diameter has been made too small a relatively small amount of expansion of the dowel sleeve will be attained for an equal exertion of anchoring force. To drive the expansion body into the sleeve for the same depth as in a relatively soft receiving material or in a drill hole with a larger bore, a considerably greater amount of force is necessary if a relatively harder receiving material is involved or if the drill hole has a smaller diameter. The required force sometimes exceeds the capability of the means available on the site. Moreover, the high expansion forces generated can lead to failure of the receiving material if the drill hole is located too close to an edge.

In the past it has been known to use an element of a soft, plastically deformable material, such as lead, positioned behind the expansion body in an expansion dowel. As the expansion body is driven into the sleeve, this soft material is displaced into the surrounding sleeve, mainly into the slots in the sleeve. Because of its low strength, the material is often displaced at the beginning of the expansion process and, as a result, subsequent blows act directly on the expansion body.

Therefore, it is the primary object of the present invention to provide an expansion dowel whose expanding forces for a predetermined displacement path of the expansion body through the sleeve does not exceed a given value.

In accordance with the present invention, the axial insertion length or depth of the expansion body within the sleeve is achieved by providing a deformation zone in the rear region of the expansion body which includes one or more transverse cross sectional constriction. The strength of the expansion body is reduced by these constrictions. Initially, the expansion body is driven in until the driving forces required for anchoring the sleeve have reached a given value. Any further increase of the driving forces results in the deformation of the expansion body until its depth of axial insertion into the sleeve has reached a selected dimension.

In an especially advantageous embodiment, the expansion body has the shape of a truncated cone from its leading or front end for a portion of its axial length. With this arrangement as the expansion body is driven into the sleeve, a uniform pressure distribution is attained and a uniform cylindrical widening or expansion of the sleeve takes place. Further, it is preferable if the bore within the sleeve from the leading end has a frusto-conical configuration corresponding approximately to that of the expansion body.

To prevent any premature deformation of the expansion body, it is expedient if the cross sectional constriction is provided as a necked-down portion. With such an arrangement, the entire trailing or rear end face of the expansion body is available for driving contact by the expansion tool. With this configuration of the expansion body, a double guidance is obtained which prevents wedging as the body is driven into the sleeve.

For manufacturing reasons, it is advantageous to provide the necked-down portion with a cylindrical shape. With a cylindrical necked-down portion, during axial deformation, it is possible to provide the maximum axial length variation in the expansion body.

To prevent any premature lateral flexing of the expansion body as it is being driven into the sleeve, it is preferable to provide the necked-down portion with a radially outwardly directed torus-shaped section.

The outside diameter of the torus-shaped section should correspond approximately to the outside diameter of the cylindrically shaped portion of the expansion body which extends axially from its frusto-conically shaped front portion. With this arrangement the outside surface of the torus-like section rides along against the surface of the bore in the sleeve. Using the torus-like section, the constriction is divided into at least two spaced axially extending sections. By providing different cross sectional areas in different parts of the constriction, a stepped deformation of the expansion body is achievable.

At the transition points of the cross sectional constriction considerable stress peaks occur during the driving in of the expansion body due to the notch effect. To prevent destruction of the expansion body, it is desirable to provide the necked-down portion with a rounded radius in the axial dimension, that is, with a fillet. In an extreme case, the rounded radius can be of such an extent that the outer surface of the constriction forms a single axially extending concave fillet. Such a shaping of the necked-down portion also greatly reduces the danger of premature outward flexing.

The various features of novelty which characterize the invention are pointed out with particularity in the claims annexed to and forming a part of this disclosure. For a better understanding of the invention, its operating advantages and specific objects attained by its use, references should be had to the accompanying drawings and descriptive matter in which there are illustrated and described preferred embodiments of the invention.

BRIEF DESCRIPTION OF THE DRAWING

In the drawing:

FIG. 1 is a side view, partly in section, illustrating an expansion dowel embodying the present invention with the expansion body positioned within the sleeve and with the sleeve in the unexpanded state;

FIG. 2 is an expansion dowel as shown in FIG. 1, but in the expanded state with the dowel positioned in a soft receiving material;

FIG. 3 is an expansion dowel similar to that shown in FIG. 1, however, the dowel is shown in the expanded state within a hard receiving material;

FIG. 4 is a side view of another embodiment of the expansion body in accordance with the present invention;

FIG. 5 is a side view of still another embodiment of the expansion body with a torus-like section located on the constriction; and FIG. 6 is a side view of yet another embodiment of the expansion body in accordance with the present invention with the constriction formed as a fillet.

DETAILED DESCRIPTION OF THE INVENTION

In FIG. 1 an expansion dowel embodying the present invention is illustrated and it consists of an axially elongated sleeve 1 with an expansion body 2 positioned in the bore through the sleeve. In FIG. 1 though the expansion body is located within the sleeve, it has not commenced the radial expansion of the sleeve. Both the sleeve and the expansion body have a leading end, that is the lower end of each as viewed in FIG. 1 and a trailing end. The leading end of the sleeve is the end first inserted into a borehole or drill hole in a receiving material and the leading end of the expansion body is the end first inserted into the bore in the sleeve.

Starting from its trailing end, the sleeve has an internal thread 1a formed in its bore. Longitudinal slots 1b are formed in the sleeve and extend from its leading end toward the trailing end. As viewed in FIG. 1 the slots extend over approximately half of the axial length of the sleeve. In the axially extending region containing the longitudinal slots 1b, the bore 1c in the sleeve has a frusto-conical configuration with its surfaces converging toward the leading end. From the trailing end of the frusto-conical portion of the sleeve its bore has a cylindrical shape. The expansion body has a cylindrically shaped axially extending rear section containing a necked-down portion 2a intermediate the end of the section and a front section in the form of a truncated cone 2b.

In FIG. 2, the expansion body 2, as illustrated in FIG. 1, has been driven axially through the sleeve expanding the sleeve radially outwardly into anchoring contact with the surface of a bore hole 3 formed in a receiving material. The expansion body has been displaced axially through the bore in the sleeve to a predetermined dimension "s" between the trailing end of the sleeve and the trailing end of the expansion body. As indicated previously, the receiving material, as shown in FIG. 2, is relatively soft, that is, it has a low strength, and the maximum expansion of the sleeve 1 has been attained.

In FIG. 3 the expansion dowel displayed in FIG. 1 is shown in the expanded state, however, as distinguished from the showing in FIG. 2, the receiving material into which it is anchored, as mentioned above, is a relatively hard material. With a conventional dowel it would not be possible with the normally available driving force to displace the expansion both through the sleeve 1 for the established insertion dimension "s" or the dowel would be overexpanded when driving the expansion body through the sleeve for the full extent of the dimension "s". In other words, the expanding forces generated in the drill hole 3 would exceed the strength of the receiving material and result in a collapse of the structure of the receiving material and would lead to failure of the dowel to be anchored within the drill hole. If excessive driving forces are developed between the sleeve 1 and the expansion body 2 it could lead to seizing or cold welding between the two parts and the insertion dimension "s" could not be reached. With the transverse cross sectional constriction provided in accordance with the present invention, when a certain driving force of the expansion body is exceeded, the leading end of the expansion body is not driven any further through the sleeve, instead the necked-down portion 2a deforms until the desired insertion dimension "s" is reached. Accordingly, the expansion body 2 is provided with an axially deformable constriction sufficient to insure that the insertion dimension "s" is achieved.

In FIG. 4 another embodiment of the expansion body incorporating the present invention is disclosed. The expansion body 4 has a necked-down portion 4a which, like the necked-down portion 2a, is cylindrical. As distinguished from the expansion body 2 shown in FIG. 1, the necked-down portion 4a is provided with rounded radii or fillets 4b at its opposite ends, that is at the transition points with the remaining portions of the rear section of the expansion body.

In FIG. 5 the expansion body 5 has an axially extending necked-down portion 5a with a torus-shaped portion 5b located intermediate the ends of the necked-down portion. The torus-shaped portion 5b prevents premature lateral flexing of the necked-down portion 5a as the expansion body is driven into the sleeve. As an alternate feature, the torus-shaped portion 5b can be formed of a different material from the remainder of the expansion body. The outside diameter of the torus-shaped portion 5b is substantially the same as the remaining portions of the rear section of the expansion body extending from the necked-down portion. By forming the necked-down portion on the opposite sides of the torus-shaped portion with different cross sectional areas, a stepped deformation of the expansion body 5 is possible.

In FIG. 6 another embodiment of the expansion body 6 is shown. In this arrangement the necked-down portion 6a is not cylindrical, rather its outer surface has a rounded radius 6b which extends for the axial length of the necked-down portion so that its outer surface forms a single concave fillet. This design of the expansion body 6 affords high driving forces during the expanding process.

While specific embodiments of the invention have been shown and described in detail to illustrate the application of the inventive principles, it will be understood that the invention may be embodied otherwise without departing from such principles.

What is claimed is:

1. Expansion dowel to be secured in a borehole comprising an axially elongated sleeve having a leading end and a trailing end with a bore extending axially therethrough from the leading end to the trailing end, said sleeve being slotted over a portion of the length thereof from the leading end toward the trailing end, the bore in said sleeve having a tapered configuration with the surface thereof diverging from the leading end toward the trailing end in the axially extending region of the slotted portion of said sleeve, an expansion body insertable into the bore in said sleeve and being disposed in surface contact with the bore at least within the tapered portion thereof and being axially displaceable therethrough for expanding said sleeve radially outwardly into anchoring engagement within a borehole, wherein the improvement comprises that said expansion body inserted into the bore in said sleeve having a leading end facing toward the leading end of said sleeve and an oppositely directed trailing end with an axially extending front region extending from the leading end toward the trailing end and an axially extending rear region extending from the trailing end toward the leading end, and said rear region having at least one axially extending annular shaped cross sectional constriction spaced radially inwardly of the adjacent axially extending exterior surfaces of said rear region and said constriction defining a deformable section being capable of deforming in the axial direction, after said expansion body has exerted a certain expansion pressure for anchoring said sleeve in the borehole, for assuring a predetermined distance between the trailing end of said sleeve and the trailing end of said expansion body.

2. Expansion dowel, as set forth in claim 1, wherein said front region of said expansion body having the shape of a truncated cone with the circumferential surface thereof tapering inwardly toward the leading end of said body.

3. Expansion dowel, as set forth in claim 2, wherein said rear region of said expansion body being cylindrically shaped and said constriction comprises a necked-down part spaced from the trailing end of said expansion body.

4. Expansion dowel, as set forth in claim 3, wherein said necked-down part being cylindrically shaped.

5. Expansion dowel, as set forth in claim 3, wherein said necked-down part includes a torus-shaped section located intermediate the opposite ends of said necked-down part and extending radially outwardly from the circumferential surface of said necked-down part.

6. Expansion dowel, as set forth in claim 5, wherein said torus-shaped section having an outside diameter substantially equal to the outside diameter of the cylindrically shaped rear region of said expansion body extending axially from said constriction.

7. Expansion dowel, as set forth in claim 6, wherein said constriction comprises a pair of axially extending cylindrically shaped parts each extending from an opposite side of said torus shaped section.

8. Expansion dowel, as set forth in claim 4, wherein each of the opposite ends of said constriction has a radially outwardly flaring fillet shaped surface.

9. Expansion dowel, as set forth in claim 3, wherein the outer surface of said necked-down portion has a concave shape for the axial length thereof.

10. Expansion dowel to be secured in a borehole comprising an axially elongated sleeve having a leading end and a trailing end with a bore extending axially therethrough from the leading end to the trailing end, said sleeve being slotted over a portion of the axial length thereof from the leading end toward the trailing end, the bore in said sleeve having a tapered configuration with the surfaces thereof diverging from the leading end toward the trailing end in the axially extending region of the slotted portion of said sleeve, an expansion body insertable into the bore in said sleeve and having a leading end and a trailing end, said expansion body being frusto-conically shaped for a portion of the axial length thereof from the leading end with the surfaces of the frusto-conically shaped portion diverging toward the trailing end and being disposed in surface contact with the portion of the bore in said sleeve having a tapered configuration when the dowel is in the unexpanded state, said expansion body being cylindrically shaped from the frusto-conically shaped portion to the trailing end thereof, said expansion body being axially displaceable through the bore in said sleeve for radially expanding said sleeve into anchoring engagement within a borehole, wherein the improvement comprises that said cylindrically shaped portion of said expansion body having an axially extending constriction spaced intermediate the ends thereof with the outside diameter of said constriction being spaced radially inwardly from the outside diameter of said cylindrically shaped portion and said constriction defining a deformable section being capable of deforming in the axial direction after said expansion body has exerted a certain expansion pressure for anchoring said sleeve in the borehole for assuring a predetermined distance between the trailing end of said sleeve and the trailing end of said expansion body.

* * * * *